(12) United States Patent
Gehring et al.

(10) Patent No.: US 10,084,560 B2
(45) Date of Patent: Sep. 25, 2018

(54) WIRELESS SOUND TRANSMISSION SYSTEM AND METHOD

(71) Applicant: Sonova AG, Staefa (CH)

(72) Inventors: Stephan Gehring, Uerikon (CH); Amre El-Hoiydi, Neuchatel (CH)

(73) Assignee: SONOVA AG, Staefa (CH)

( * ) Notice: Subject to any disclaimer, the term of this patent is extended or adjusted under 35 U.S.C. 154(b) by 0 days.

(21) Appl. No.: 15/708,253

(22) Filed: Sep. 19, 2017

(65) Prior Publication Data

US 2018/0006752 A1   Jan. 4, 2018

Related U.S. Application Data

(63) Continuation of application No. 14/237,220, filed as application No. PCT/EP2011/063708 on Aug. 9, 2011, now abandoned.

(51) Int. Cl.
| | |
|---|---|
| *H04J 3/16* | (2006.01) |
| *H04R 25/00* | (2006.01) |
| *H04J 3/06* | (2006.01) |
| *H04R 27/02* | (2006.01) |

(52) U.S. Cl.
CPC .............. *H04J 3/1694* (2013.01); *H04J 3/06* (2013.01); *H04R 25/554* (2013.01); *H04R 25/407* (2013.01); *H04R 25/552* (2013.01); *H04R 25/558* (2013.01); *H04R 27/02* (2013.01); *H04R 2201/107* (2013.01); *H04R 2225/55* (2013.01); *H04R 2420/07* (2013.01); *H04R 2430/01* (2013.01); *H04S 2400/15* (2013.01)

(58) Field of Classification Search
CPC ... H04J 3/1694; H04J 3/16; H04J 3/06; H04R 25/554; H04R 25/55; H04R 2225/55
USPC .................................. 370/330; 381/56, 312
See application file for complete search history.

(56) References Cited

U.S. PATENT DOCUMENTS

| | | | |
|---|---|---|---|
| 5,790,527 A | * | 8/1998 | Janky .................. H04B 7/2615 370/321 |
| 8,019,386 B2 | | 9/2011 | Dunn et al. |
| 8,150,057 B2 | | 4/2012 | Dunn |

(Continued)

FOREIGN PATENT DOCUMENTS

| | | |
|---|---|---|
| WO | 96/17453 A2 | 6/1996 |
| WO | 2007132023 A2 | 11/2007 |
| WO | 2008/098590 A1 | 8/2008 |

*Primary Examiner* — Kwang B Yao
*Assistant Examiner* — Syed M Bokhari

(57) ABSTRACT

A method for providing sound to at least one user, in which audio signals are captured and transformed into audio data that is transmitted to at least one receiver unit; audio signals are generated from the received audio data and the hearing of the user(s) stimulated thereby; wherein the audio data is transmitted as audio data packets in separate slots of a TDMA frame structure, wherein the transmission unit and the receiver unit(s) are synchronized to form a wireless network, wherein each TDMA frame structure has at least one listening slot during which the synchronized network members do not transmit data and at least one network members listens, and wherein control data is transmitted from an external control device according to a sequence pattern selected according to the duration and periodicity of the listening slot(s) to be received by the at least one synchronized network member during said listening slot(s).

20 Claims, 9 Drawing Sheets

(56) References Cited

U.S. PATENT DOCUMENTS

| | | |
|---|---|---|
| 8,194,902 B2 | 6/2012 | Pedersen |
| 2002/0193945 A1* | 12/2002 | Tan ................... H04B 7/2671 |
| | | 701/469 |
| 2005/0195996 A1 | 9/2005 | Dunn et al. |
| 2010/0158292 A1 | 6/2010 | Pedersen |
| 2010/0166209 A1 | 7/2010 | Dunn |
| 2011/0150249 A1* | 6/2011 | Klemmensen ....... H04R 1/1008 |
| | | 381/312 |
| 2012/0310395 A1* | 12/2012 | El-Hoiydi ............. H04W 48/16 |
| | | 700/94 |
| 2013/0064379 A1* | 3/2013 | Pardo ..................... H04S 7/40 |
| | | 381/56 |
| 2013/0102251 A1* | 4/2013 | Linde ...................... H04L 1/04 |
| | | 455/41.2 |

* cited by examiner

WIRELESS SOUND TRANSMISSION SYSTEM AND METHOD

CROSS-REFERENCE TO RELATED APPLICATION

The application is a continuation of U.S. patent application Ser. No. 14/237,220 filed on Apr. 24, 2014, which is titled "Wireless Sound Transmission System and Method," which claims priority to International Application No. PCT/EP2011/063708 filed Aug. 9, 2011 titled "Wireless Sound Transmission System and Method," both of which are incorporated by reference in their entireties.

FIELD OF THE INVENTION

The invention relates to a system and a method for providing sound to at least one user, wherein audio signals from an audio signal source, such as a microphone for capturing a speaker's voice, are transmitted via a wireless link to a receiver unit, such as an audio receiver for a hearing aid, from where the audio signals are supplied to means for stimulating the hearing of the user, such as a hearing aid loudspeaker.

BACKGROUND

Wireless networking devices have a finite communication range which is limited by the output power of the transmitting device, the signal attenuation in the wireless channel and the sensitivity of the receiving device. The limitations can be regulatory restrictions (maximum allowed output power), technical constraints (size of transmitting and receiving antennas, electrical power consumed by transmitting device or receiving device), or the physical environment (e.g., obstructing walls).

Furthermore, wireless links are not necessarily symmetric. A link from node 1 to a node 2 does not imply a link in the reverse direction. The reasons for such asymmetry can be technical (such as differences (tolerances) in receiver sensitivity between the two nodes or deliberate transmission power reduction in order to conserve battery power), due to the environment in which the nodes operate, or due to the device construction itself (in case of simple transmit-only devices).

A wireless network suitable for hearing instruments may be an inductive link connecting a right-ear hearing instrument and a left-ear hearing instrument with each other and with accessory devices (typically body-worn) comprising a microphone and/or acting as an interface to external devices, such as a phone or mobile phone.

Another type of wireless network for hearing instruments uses an electromagnetic (i.e., far-field) link for connecting remote accessory devices, such as a wireless microphone, to an ear-level receiver device.

Typically, such remote wireless microphones are used by teachers teaching hearing impaired persons in a classroom (wherein the audio signals captured by the wireless microphone of the teacher are transmitted to a plurality of receiver units worn by the hearing impaired persons listening to the teacher) or in cases where several persons are speaking to a hearing impaired person (for example, in a professional meeting, wherein each speaker is provided with a wireless microphone and with the receiver units of the hearing impaired person receiving audio signals from all wireless microphones). Another example is audio tour guiding, wherein the guide uses a wireless microphone.

Another typical application of wireless audio systems is the case in which the transmission unit is designed as an assistive listening device. In this case, the transmission unit may include a wireless microphone for capturing ambient sound, in particular from a speaker close to the user, and/or a gateway to an external audio device, such as a mobile phone; here the transmission unit usually only serves to supply wireless audio signals to the receiver unit(s) worn by the user.

U.S. Patent Application Publication 2005/0195996 A1 and corresponding U.S. Pat. No. 8,019,386 B2 relate to a hearing assistance system comprising a plurality of wireless microphones worn by different speakers and a receiver unit worn at a loop around a listener's neck, with the sound being generated by a headphone connected to the receiver unit, wherein the audio signals are transmitted from the microphones to the receiver unit by using a spread spectrum digital signals. The receiver unit controls the transmission of data, and it also controls the pre-amplification gain level applied in each transmission unit by sending respective control signals via the wireless link.

International Patent Application Publication WO 2008/098590 A1 relates to a hearing assistance system comprising a transmission unit having at least two spaced apart microphones, wherein a separate audio signal channel is dedicated to each microphone, and wherein at least one of the two receiver units worn by the user at the two ears is able to receive both channels and to perform audio signal processing at ear level, such as acoustic beam forming, by taking into account both channels.

One option to implement a wireless network for hearing instruments is to use a time division multiple access (TDMA) scheme with central or distributed network management, wherein one of the devices acts as a master and determines the time slots during which each network device may transmit data and communicates this transmission schedule to the participating devices. A device entering the network must first register with the network master and can subsequently request reservation of time slots to transmit its data to recipient devices, i.e., a device is allowed to transmit only once it has synchronized with the network. In case that the network uses a frequency hopping scheme, the master transmits the necessary information to the synchronized devices.

An example of a wireless network for hearing devices is described in U.S. Patent Application Publication 2010/0166209 A1 and corresponding U.S. Pat. No. 8,150,057 B2, wherein audio signals are transmitted from a plurality of wireless microphones worn by various speakers via the wireless network to a receiver unit worn by a listener. Each of the transmission devices has certain dedicated slots in the TDMA scheme for transmitting the audio signals captured by the microphone to the receiver unit.

Another example of a wireless network suitable for audio signal transmission is the BLUETOOTH® standard.

U.S. Patent Application Publication 2010/0158292 A1 and corresponding U.S. Pat. No. 8,194,902 B2 relate to a wireless network comprising a binaural hearing aid and other components, like a mobile phone, wherein a TDMA structure is used in a frequency hopping scheme, and wherein, during acquisition/synchronization, the frequency hopping scheme has a reduced number of frequency channels and the new device activates its receiver at a rate different from the frame rate of the network until synchronization data is received from the master device, whereupon the frame timing of the new device is synchronized to the frame timing of the network.

In the above-discussed systems, only members of the network, i.e., nodes which are synchronized to the network clock of the master device, are allowed to send messages to other nodes in the network. Thus, each device that wants to send a message to a network member has to synchronize to the network first, and therefore, has to receive messages from at least one of the network members, namely the master device. This imposes certain restrictions on such a device and also requires a certain time before a message can be sent, namely the time needed for synchronizing to the network.

SUMMARY OF THE INVENTION

It is an object of the invention to provide for a wireless sound transmission system and method, which allows the transmission of control data in a particularly simple manner.

According to the invention, this object is achieved by a method and a system as described herein.

The invention is beneficial in that, by providing at least one slot in each TDMA frame structure, such as in each superframe or each frame, during which none of the synchronized network members is allowed to transmit data while at least one of the synchronized network members listens, with control data being transmitted from an external control device which is not a synchronized network member according to a sequence pattern selected according to the duration and periodicity of the listening slot(s) in order to be received by the at least one of the synchronized network members, external control devices may send control data to at least one of the synchronized network members with minimal interference to (i.e., interruption of) the network, without the need to become a synchronized network member. In particular, the external control device thus may be designed as a transmit-only device, and the time and resources necessary for synchronization of such external device can be saved.

Hereinafter, the term "audio data" is to be understood as designating not only data representing an audio signal but also data relating to audio processing, such as gain, filter or program settings in an audio device, information regarding an acoustic scene, information regarding direction, quality or other characteristics of a sound source, firmware data or the like which may change the audio signal processing capabilities in an audio device, or any other data which has an impact on the audio processing path in an audio device.

Hereinafter, the term "TDMA frame structure" is to be understood as including any periodicity above the slot level, such as what is known in the art as "TDMA frame" or "TDMA superframe".

Hereinafter, examples of the invention will be described in detail with reference to the accompanying drawings.

DETAILED DESCRIPTION OF THE INVENTION

The present invention relates to a system for providing hearing assistance to at least one user, wherein audio signals are transmitted, by using a transmission unit comprising a digital transmitter, from an audio signal source via a wireless digital link to at least one receiver unit, from where the audio signals are supplied to means for stimulating the hearing of the user, typically a loudspeaker, but including any other type of stimulation, such as a cochlear implant electrode or an implantable electromechanical actuator coupled to an ossicle or directly to the cochlea.

The invention is not restricted to a particular kind of the wireless link. For example, the invention may be applied to an inductive link (magnetic near-field coupling between the antennas), as it may be used in hearing instrument body area networks (wherein hearing devices and accessories of hearing devices are worn on the user's body and/or are manually handled as hand-held devices by the user), or an electro-magnetic (far-field) link, as it may used in networks of a plurality of hearing instruments worn by several users, including wireless microphones. Also, in addition to audio data, other kinds of data, such as control data, may be transmitted via the wireless link, i.e., the network. The invention can be used also with infra-red links.

Figure 1:
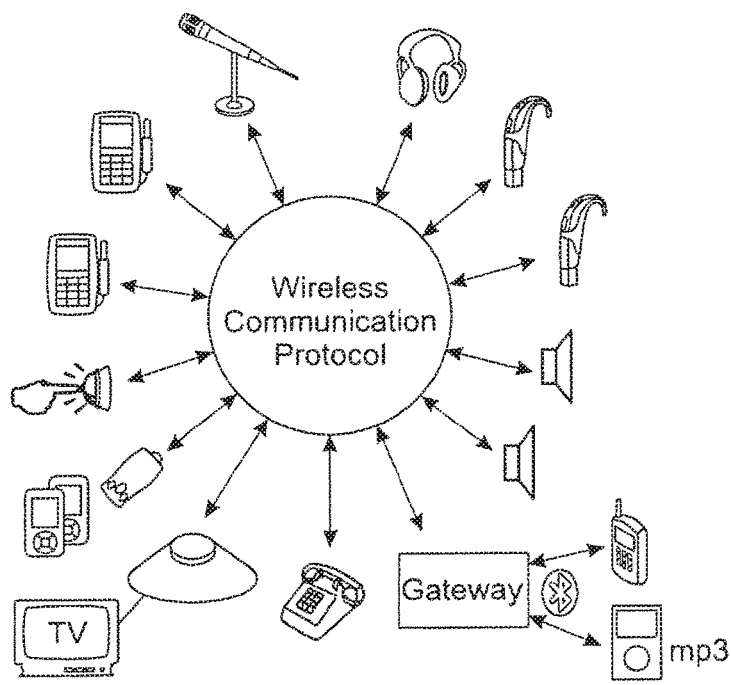
FIG. 1 is a schematic view of audio components which can be used with a system according to the invention.

As shown in FIG. 1, the device used on the transmission side may be, for example, a wireless microphone used by a speaker in a room for an audience; an audio transmitter having an integrated or a cable-connected microphone which are used by teachers in a classroom for hearing-impaired pupils/students; an acoustic alarm system, like a door bell, a fire alarm or a baby monitor; an audio or video player; a television device; a telephone device; a gateway to audio sources like a mobile phone, music player, etc. The transmission devices include mobile (e.g., body-worn) devices as well as fixed devices. The devices on the receiver side include headphones, all kinds of hearing aids, ear pieces, such as for prompting devices in studio applications or for covert communication systems, and loudspeaker systems. The receiver devices may be for hearing-impaired persons or for normal-hearing persons. Also on the receiver side a gateway could be used which relays audio signal received via a digital link to another device comprising the stimulation means.

The system may include a plurality of devices on the transmission side and a plurality of devices on the receiver side, for implementing a network topology, usually in a master-slave configuration (however, also distributed (decentralized) network control is an option).

The transmission unit may comprise or may be connected to a microphone for capturing audio signals, which is typically worn by a user, with the voice of the user being transmitted via the wireless audio link to the receiver unit. Alternatively or in addition, the transmission may comprises an interface for receiving audio signals from external audio devices, such as a phone, a mobile phone, a music player, a TV set or a HiFi-set, via a wireless (e.g., BLUETOOTH®) or plug-in connection (a schematic example of such system is shown FIG. 5).

The receiver unit typically is connected to a hearing aid via an audio shoe or is integrated within a hearing aid.

The wireless link between the transmission unit(s) and the receiver unit(s) may be an inductive link (magnetic near-field coupling between the antennas) or an electromagnetic (far-field) link.

In addition to the audio signals, control data may be transmitted between the transmission unit and the receiver unit. Such control data may include, for example, volume control or a query regarding the status of the receiver unit or the device connected to the receiver unit (for example, battery state and parameter settings). Alternatively, such control data transmission may be taken up by a third device, e.g., a remote control or status read-out device.

Figure 2:
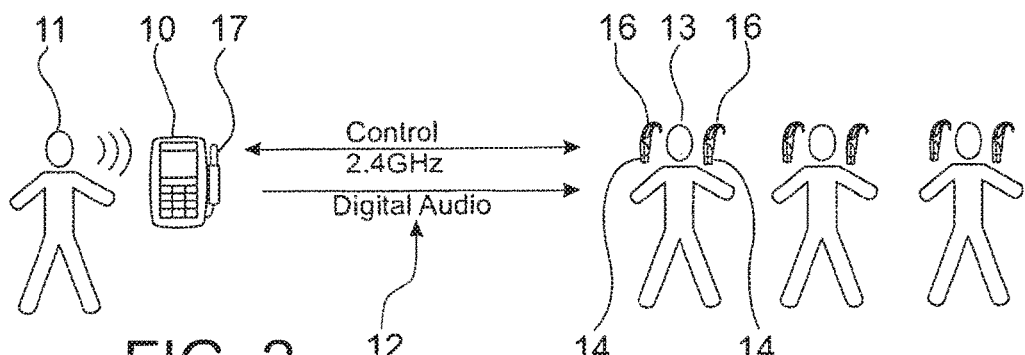
FIGS. 2 to 4 are schematic views of a use of various examples of a system according to the invention.

In FIG. 2, a typical use case is shown schematically, wherein a body-worn transmission unit 10 comprising a microphone 17 is used by a teacher 11 in a classroom for transmitting audio signals corresponding to the teacher's voice via a digital link 12 to a plurality of receiver units 14, which are integrated within or connected to hearing aids 16 worn by hearing-impaired pupils/students 13. The digital link 12 is also used to exchange control data between the transmission unit 10 and the receiver units 14. Typically, the transmission unit 10 is used in a broadcast mode, i.e., the same signals are sent to all receiver units 14.

Figure 3:
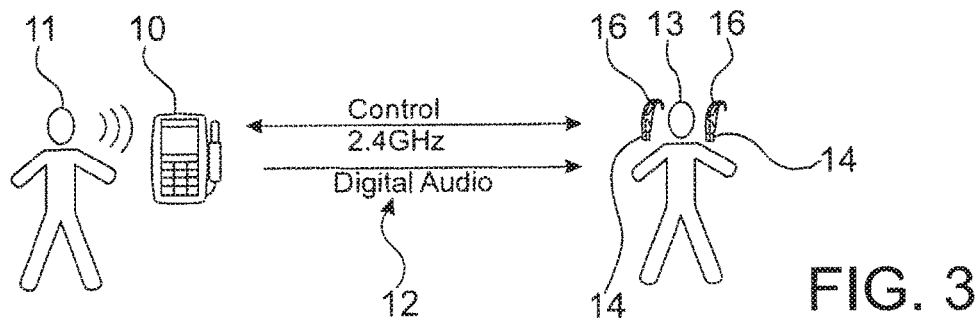

Another typical use case is shown in FIG. 3, wherein a transmission unit 10 having an integrated microphone is used by a hearing-impaired person 13 wearing receiver units 14 connected to or integrated within a hearing aid 16 for capturing the voice of a person 11 speaking to the person 13. The captured audio signals are transmitted via the digital link 12 to the receiver units 14.

Figure 4:
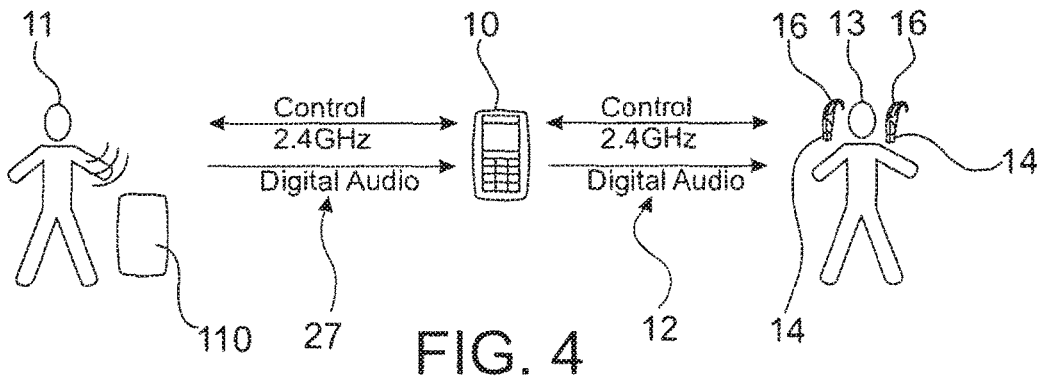

A modification of the use case of FIG. 3 is shown in FIG. 4, wherein the transmission unit 10 is used as a relay for relaying audio signals received from a remote transmission unit 110 to the receiver units 14 of the hearing-impaired person 13. The remote transmission unit 110 is worn by a speaker 11 and comprises a microphone for capturing the voice of the speaker 11, thereby acting as a companion microphone.

According to a variant of the embodiments shown in FIGS. 2 to 4 the receiver units 14 could be designed as a neck-worn device comprising a transmitter for transmitting the received audio signals via an inductive link to an ear-worn device, such as a hearing aid.

The transmission units 10, 110 may comprise an audio input for a connection to an audio device, such as a mobile phone, a FM radio, a music player, a telephone or a TV device, as an external audio signal source. In some cases, the microphone then may be omitted.

In each of such use cases, the transmission unit 10 usually comprises an audio signal processing unit (not shown in FIGS. 2 to 4) for processing the audio signals captured by the microphone or received from an external audio signal source prior to being transmitted.

In the embodiments of FIGS. 2 to 4, the link 12 is an electromagnetic (far-field) link.

Figure 5:
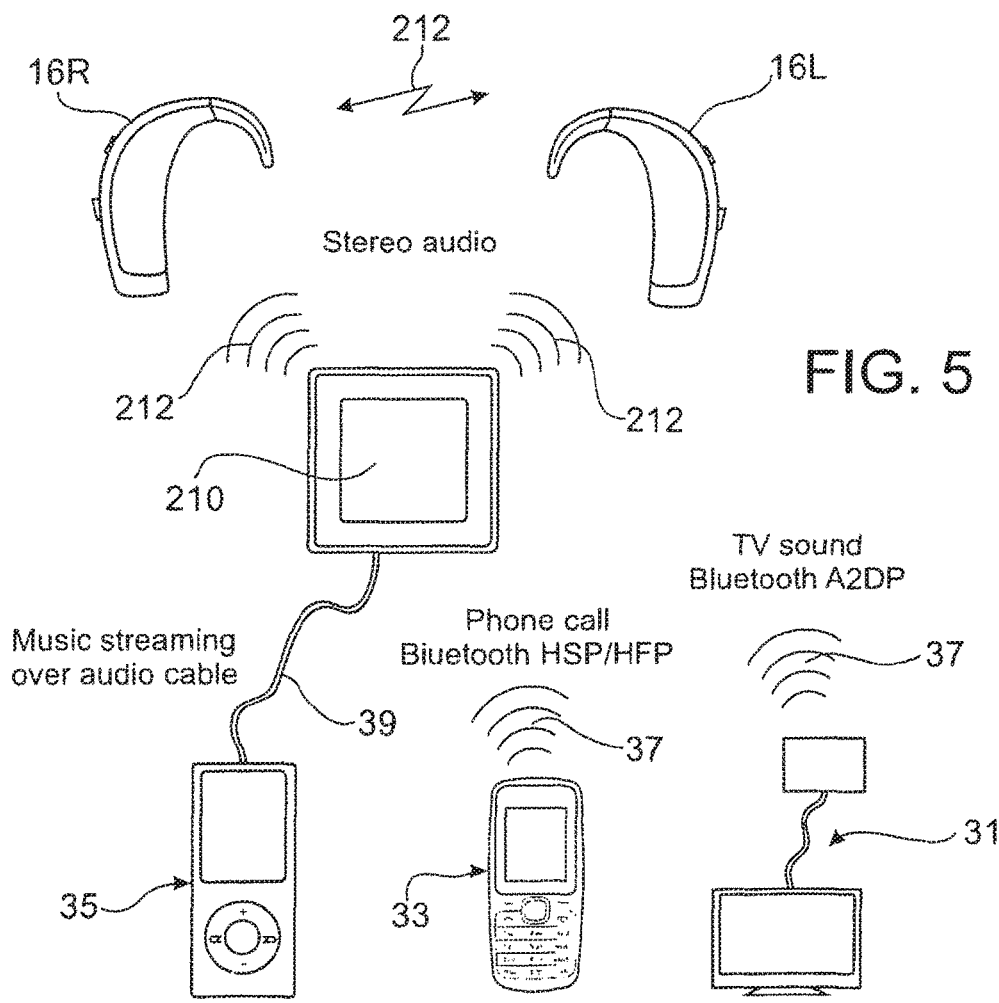
FIG. 5 is a schematic view of another example of a system according to the invention.

In FIG. 5, a schematic example of a system is shown, including a transmission unit 210 which comprises a wireless interface (e.g., BLUETOOTH®) for receiving audio signals via wireless (e.g., BLUETOOTH®) link 37 from external audio devices such as a TV set 31 or a mobile phone 33 and a plug-in interface for receiving audio signals via a wired connection 39 from external audio devices such as a music player 35 and which transmits the audio signals received from the external audio devices 31, 33, 35 as stereo or mono signals via a wireless inductive link 212 to receiver units (not shown) which are integrated within a right ear hearing aid 16 and a left ear hearing aid 16. The hearing aids 16 may be designed to a exchange audio signals and/or control signals via the inductive link 212 in order to a realize a binaural system. The transmission unit 210 typically is worn on the body of the user of the hearing aids 16, for example, on a neck loop. If the transmission unit 210 is designed as a mere audio streaming device, it does not comprise a microphone.

Figure 14:
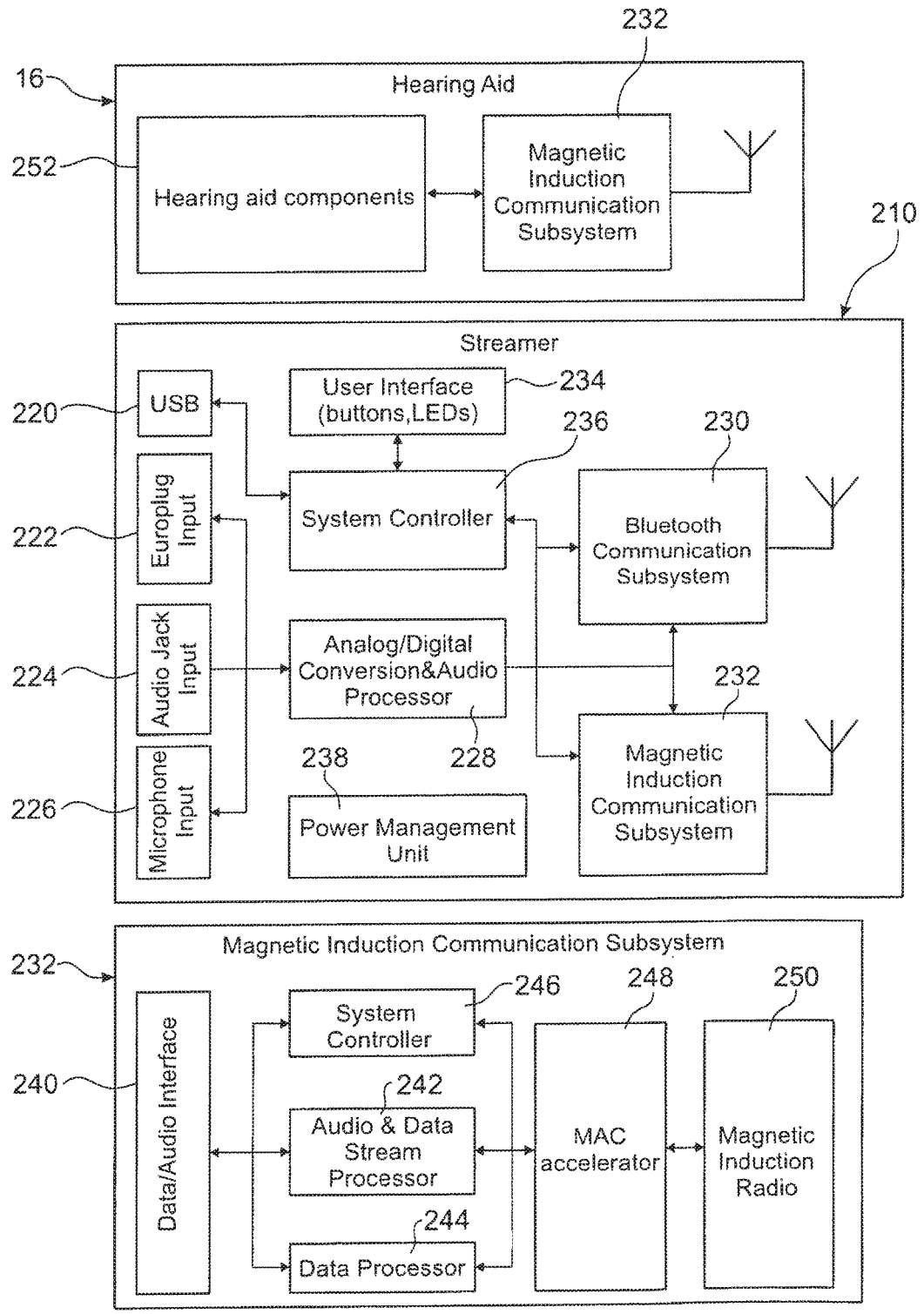
FIG. 14 is a block diagram of another example of a transmission unit to be used with the invention.

A block diagram of an example of such transmission unit 210 is shown in FIG. 14. The transmission unit 210 comprises several inputs, for example, at least one digital interface, such as a USB port 220, for data exchange, and some analog audio inputs, such as a Europlug input 222, an audio jack input 224 and a microphone input 226. The signals from the analog inputs 222, 224, 226 are converted to digital signals and are processed in a audio processing unit 228 prior to being supplied to a BLUETOOTH® communication subsystem 230 and to a magnetic induction (MI) communication subsystem 232. The BLUETOOTH® communication subsystem 230 may transmit the audio data to external devices having a BLUETOOTH® interface, such as the mobile phone 33, and may receive audio data from such external devices, such as the mobile phone 33 and the TV set 31. The MI communication subsystem 232 is provided for transmitting audio data supplied by the audio signal processing unit 228 and by the BLUETOOTH® communication subsystem 230 via the link 212 to the hearing aids 16. However, the link is bidirectional, i.e., audio and data may also be sent from the hearing aids to the accessory device, for example, to use the hearing aid as a wireless headset, where the hearing aid microphones are used to capture the patient's voice and to send corresponding audio back to the accessory device and on to the mobile phone. There may further audio data and control data exchange between the BLUETOOTH® communication subsystem 230 and the MI communication subsystem 232. The unit 210 also comprises a user interface 234, a system controller 236, and a power management unit 238, with the system controller 236 controlling operation of the unit 210, in particular with regard to the BLUETOOTH® communication subsystem 230 and the MI communication subsystem 232.

The MI communication subsystem 232, which is shown in more detail at the bottom of FIG. 14, comprises a data/audio interface 240 for communication with the audio signal processing unit 228, the BLUETOOTH® communication subsystem 230 and the system controller 234, an audio and data stream processor 242 for compressing/decompressing audio signals and managing/aligning meta data (real time data) with audio, a data processor 244 for treating control data, such as remote control commands, and a system controller 246. The system controller 246 is for implementing the MI protocol and thus controls the MI communication and the MI communication subsystem 232 in general. The MI communication subsystem 232 also includes an MAC accelerator 248 and an MI radio 250. The MAC accelerator 248 is a component for treating the real-time aspects of the MI communication subsystem 232, in particular the timing of transmission and receipt within the TDMA system and control of the MI radio 250. The MI radio is for converting the digital signals supplied by the MAC accelerator 248 into analog transmission signals and vice versa.

Also the hearing 16 is provided with a MI communication subsystem 232 of the type used in the unit 210 in order to exchange audio and control data with the typical hearing aid components (indicated as block 252 in FIG. 14) via the interface 240.

Figure 6:
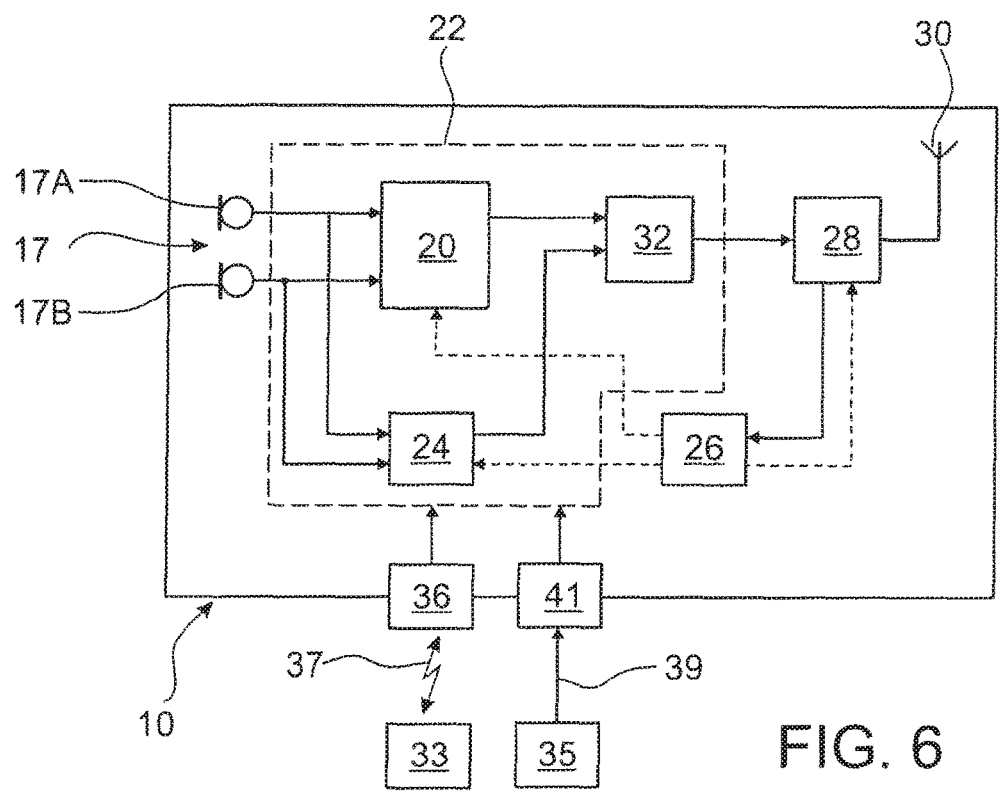
FIG. 6 is a block diagram of an example of a transmission unit to be used with the invention.

A block diagram of another example of a transmission unit 10 is shown in FIG. 6, which comprises a microphone arrangement 17 for capturing audio signals from the respective speaker's 11 voice, an audio signal processing unit 20 for processing the captured audio signals, a digital transmitter 28 and an antenna 30 for transmitting the processed audio signals as an audio stream consisting of audio data packets. One function of the audio signal processing unit 20 is to compress the audio data using an appropriate audio codec, as it is known in the art. The compressed audio stream is transmitted via a digital audio link 12 established between the transmission units 10 and the receiver unit 14, which link also serves to exchange control data packets between the transmission unit 10 and the receiver unit 14.

The transmission units 10 may include additional components, such as a voice activity detector (VAD) 24. The audio signal processing unit 20 and such additional components may be implemented by a digital signal processor (DSP) indicated at 22. In addition, the transmission units 10 also may comprise a microcontroller 26 acting on the DSP 22 and the transmitter 28. The microcontroller 26 may be omitted in case that the DSP 22 is able to take over the function of the microcontroller 26. Preferably, the microphone arrangement 17 comprises at least two spaced-apart microphones 17A, 17B, the audio signals of which may be used in the audio signal processing unit 20 for acoustic beam forming in order to provide the microphone arrangement 17 with a directional characteristic.

The VAD 24 uses the audio signals from the microphone arrangement 17 as an input in order to determine the times when the person 11 using the respective transmission unit 10 is speaking. The VAD 24 may provide a corresponding control output signal to the microcontroller 26 in order to have, for example, the transmitter 28 sleep during times when no voice is detected and to wake up the transmitter 28 during times when voice activity is detected. In addition, a control command corresponding to the output signal of the VAD 24 may be generated and transmitted via the wireless link 12 in order to mute the receiver units 14 or saving power when the user 11 of the transmission unit 10 does not speak. To this end, a unit 32 is provided which serves to generate a digital signal comprising the audio signals from the processing unit 20 and the control data generated by the VAD 24, which digital signal is supplied to the transmitter 28.

In addition to the VAD 24, the transmission unit 10 may comprise an ambient noise estimation unit (not shown in FIG. 6) which serves to estimate the ambient noise level and which generates a corresponding output signal which may be supplied to the unit 32 for being transmitted via the wireless link 12.

The transmission unit 10 also may comprise inputs for audio signals supplied by external audio sources 33, 35, such as a plug-in interface 36 and/or a wireless interface 41, such as a BLUETOOTH® interface. Such external audio sources 33, 35 may be, for example, a phone, a mobile phone, a music player, a computer or a TV set. In particular, by providing such interfaces 36, 41 a plurality of audio signal input channels to the transmission unit 10 are realized.

According to one embodiment, the transmission units 10 may be adapted to be worn by the respective speaker 11 below the speaker's neck, for example, as a lapel microphone or as a shirt collar microphone. This type of transmission unit 10 is typically used when the wireless audio link is implemented as an electromagnetic (far-field) link 12.

When the wireless audio link is implemented as an inductive link 212, the transmission unit 210, by contrast, is worn by the user of the receiver unit 14/hearing aid 16, for example below the user's neck. In some cases, the microphone arrangement 17 and the VAD 24 of the example of FIG. 6 then may be omitted.

Figure 7:
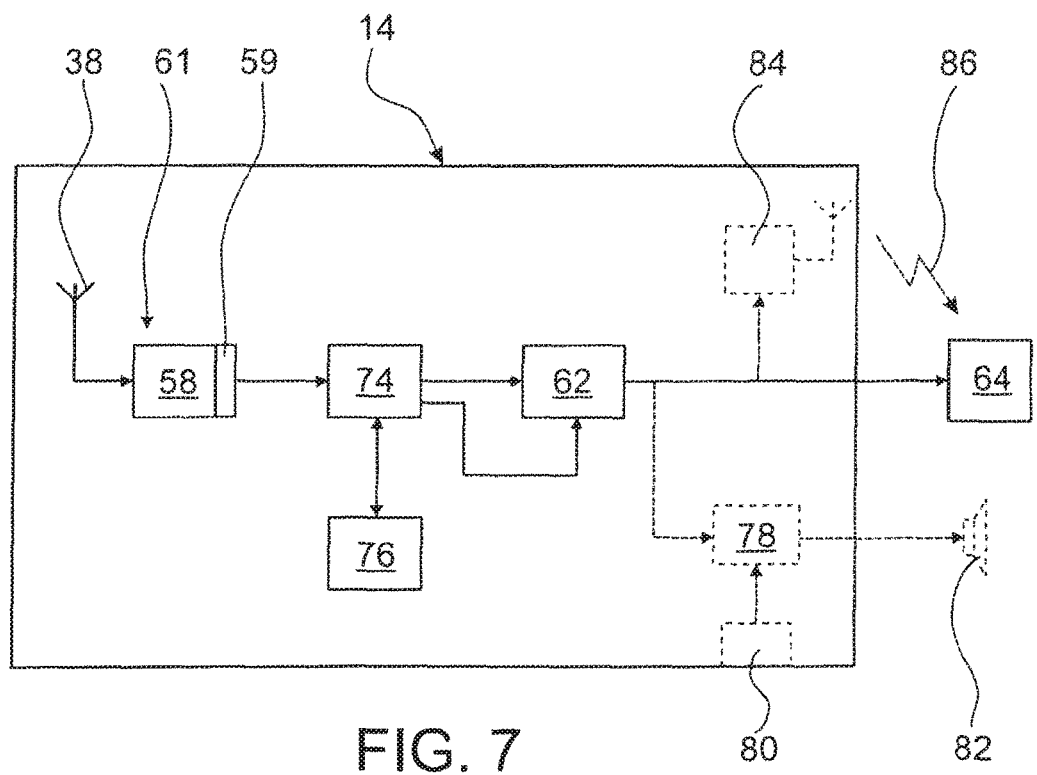
FIG. 7 is a block diagram of an example of a receiver unit to be used with the invention.

An example of a digital ear-level receiver unit 14 is shown in FIG. 7, according to which the antenna arrangement 38 is connected to a digital transceiver 61 including a demodulator 58 and a buffer 59. The signals transmitted via the digital link 12 are received by the antenna 38 and are demodulated in the digital radio receivers 61. The demodulated signals are supplied via the buffer 59 to a DSP 74 acting as processing unit which separates the signals into the audio signals and the control data and which is provided for advanced processing, e.g., equalization, of the audio signals according to the information provided by the control data. The processed audio signals, after digital-to-analog conversion, are supplied to a variable gain amplifier 62 which serves to amplify the audio signals by applying a gain controlled by the control data received via the digital link 12. The amplified audio signals are supplied to a hearing aid 64. Alternatively, the audio signals may be supplied as digital signals to the hearing aid. The receiver unit 14 also includes a memory 76 for the DSP 74.

Rather than supplying the audio signals amplified by the variable gain amplifier 62 to the audio input of a hearing aid 64, the receiver unit 14 may include a power amplifier 78 which may be controlled by a manual volume control 80 and which supplies power amplified audio signals to a loudspeaker 82 which may be an ear-worn element integrated within or connected to the receiver unit 14. Volume control also could be done remotely from the transmission unit 10 by transmitting corresponding control commands to the receiver unit 14.

Another alternative implementation of the receiver unit may be a neck-worn device having a transmitter 84 for transmitting the received signals via with an magnetic induction link 86 (analog or digital) to the hearing aid 64 (as indicated by dotted lines in FIG. 7).

In general, the role of the microcontroller 24 could also be taken over by the DSP 22. Also, signal transmission could be limited to a pure audio signal, without adding control and command data.

Figure 8:
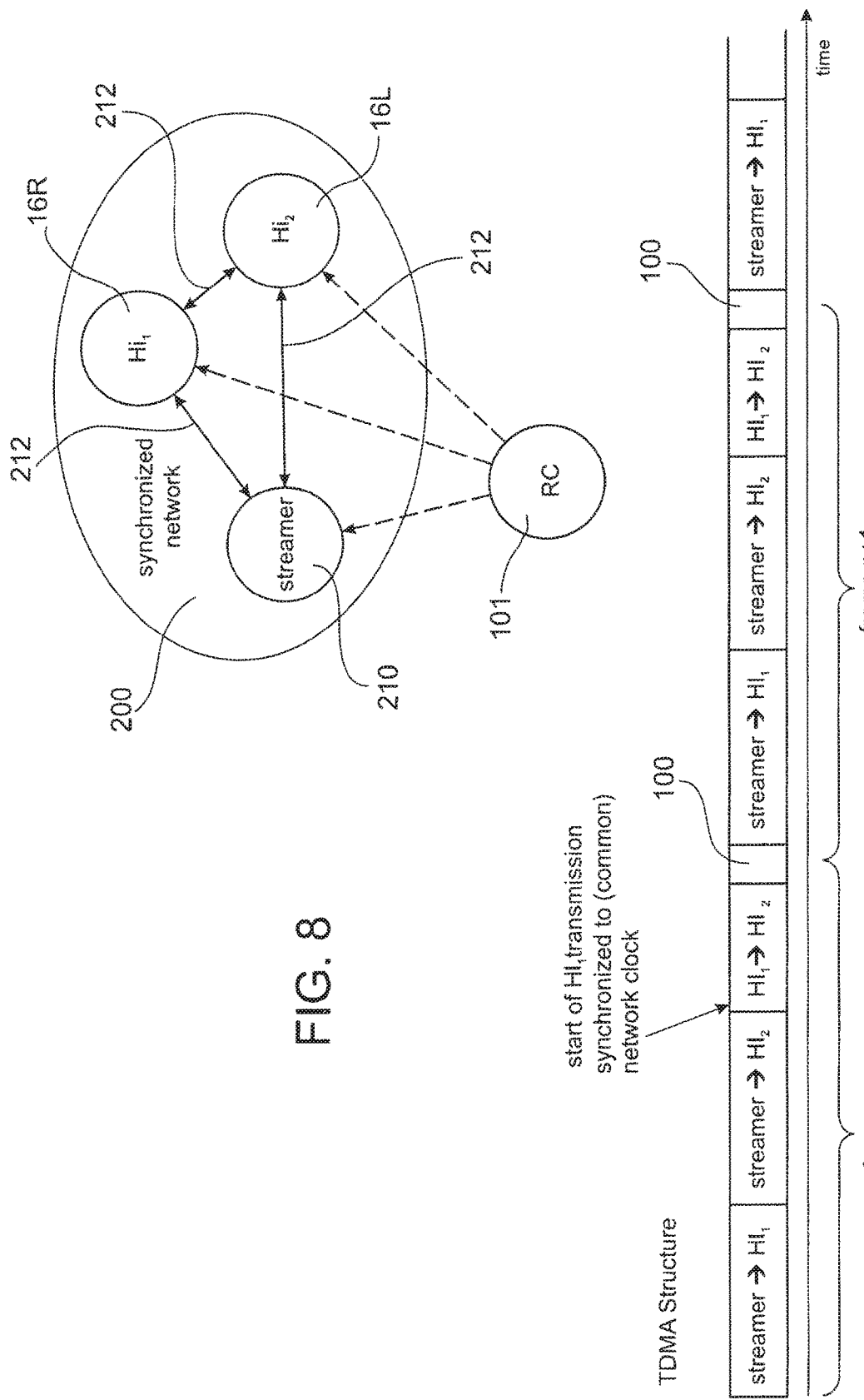
FIG. 8 shows a schematic example of the TDMA frame scheme of a digital link implemented in a system of the invention.

In FIG. 8 a schematic example of a TDMA structure of the inductive wireless audio link 212 of a system like the one shown in FIG. 5 is shown, wherein certain slots of each TDMA frame are attributed to one of the members of the synchronized network 200 (in the example shown in FIG. 8, the synchronized network members are the transmission units 210, the right-ear hearing aid 16R and the left-ear hearing aid 16L). In the example shown in FIG. 8, the first slot (or group of slots) is attributed to the transmission unit 210 for data transmission to the right-ear hearing aid 16R, a second slot (or group of slots) is attributed to the transmission unit 210 for transmission of data to the left-ear hearing aid 16L, and a third slot (or group of slots) is attributed to the right-ear hearing aid 16R for transmitting data to the left-ear hearing aid 16L. One of the synchronized network members may act as a master which attributes the TDMA slots to the other members, wherein each network member has to synchronize with the master. However, also a distributed control configuration is conceivable.

Preferably, all network members transmit (and listen) at a single frequency, which preferably is 10.6 MHz. Preferably, the wireless link 212 may employ Binary Frequency Shift Keying (BFSK), Quadrature Phase Shift Keying (QPSK) or pulse-count modulation (PCTM) with 8 Phase Shift Keying (8PSK).

The data transmitted from the transmission unit 210 to the hearing aid 16R, 16L will be mainly audio data received from the external audio devices 31, 33, 35, with the transmission unit 210 thereby acting as a streamer. Also, the hearing aids 16R, 16L may transmit audio data in order to realize a binaural system.

Each frame also includes at least one slot 100, during which none of the synchronized network members is allowed to transmit data while at least one, preferably all, of the synchronized network members listen. Such listening slot 100 is used to allow an external control device 101 (for example, a remote control) to transmit control data (i.e., any data that is not audio data) to at least one of the synchronized network members, while the external control device 101 is not a synchronized network member. The control data is transmitted according to a sequence pattern selected according to the duration and periodicity of the listening slot(s) 100. Preferably, the external control device 101 does not wait for any response from the synchronized network members.

Figure 9:
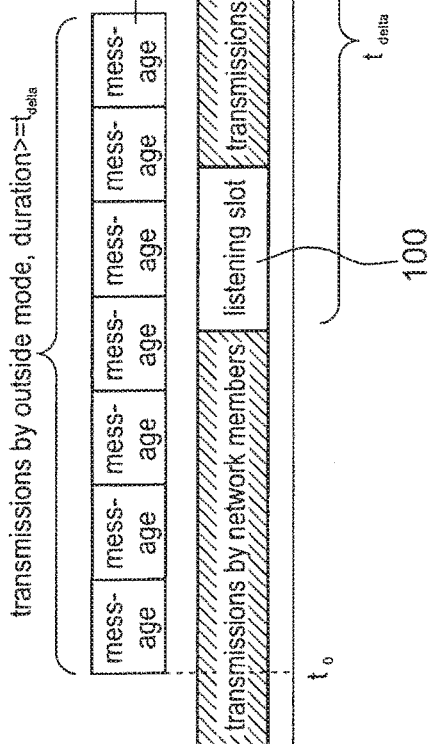
FIG. 9 shows an example of the TDMA frame scheme of FIG. 8 together with an example of the transmission from an external control unit.
Figure 10:
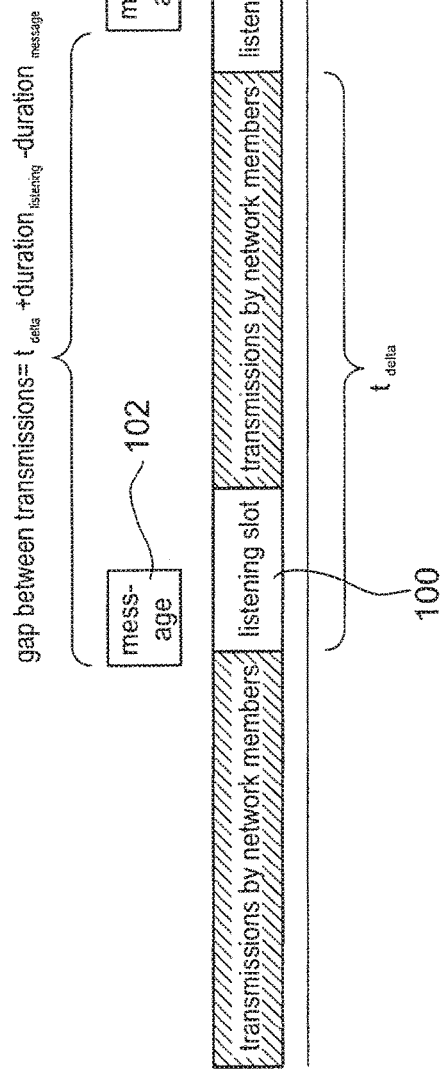
FIG. 10 is a view like FIG. 9, wherein an alternative example of the TDMA frame scheme is shown.

In FIGS. 9 and 10, two examples are illustrated of how the sequence pattern of the control data transmission can be selected according to the duration of the listening slots 100.

In the example shown in FIG. 9, the control data is contained in a control data block 102 which is transmitted as immediate repetitions during a control data period, wherein the duration of the listening slot 100 is at least twice the length of the control data block 102 (or stated the other way round, the length of the control data block is not more than half of the length of the listening slot 100). Preferably, the duration of the control data period is at least the length of the periodicity of the listening slots (indicated in FIG. 9 by "$t_{delta}$"), with the periodicity of the listening slots corresponding to the length of the frames.

The external control device 101 represents a node which cannot synchronize its transmission clock to that of the synchronized network members, i.e., the nodes in the network, for example, because the external control device 101 is not in the range of the network 200 in the sense that the signals transmitted by the network members are too weak to be received or because it does not have a receiver suitable for receiving such signals of the synchronized network 200. The listening slot 100 is at the same offset in every frame relative to the beginning of the frame, and a listening slot can be present in every frame of only in every n-th frame. The maximum time between successive listening slots 100 ($t_{delta}$) determines the maximum delay a message from the external device 101 takes to reach a synchronized network member.

While in FIGS. 9 and 10 only a single listening slot per frame is shown, it is to be understood that several listening slots may be present in each frame. The slots may be evenly or unevenly spaced within the frame, with $t_{delta}$ determining the maximum delay of receiving control data from an unsynchronized device.

The external device 101 is aware that the listening slots 100 exist, but, since it is not synchronized to the network clock, it does not know when the listening slots 100 actually occur. As a consequence, the external device 101 sends the message 102 for the duration of at least the listening slot periodicity $t_{delta}$. Since the duration of the listening slots 100 is at least twice the maximum length of the message 102, the message block 102 always fits entirely within one of the listening slots 100, irrespective of when the external device 100 starts sending the message 102 for the first time.

Those of the synchronized network members which listen during the respective listening slot 100 during which the external device 101 transmits one copy of the message 102 will receive the message 102. Depending on the number of times the message 102 is repeated by the external device 101 and on the length of the listening slot relative to the length of the control data message, the synchronized network members may receive the same message 102 multiple times, and thus, have to be designed to tolerate and handle duplicates (for example, by detecting and ignoring duplicates as is known in the art).

In the calculation of the transmission duration of the external device 101, the length of the TDMA slots, the length of the message 102 and clock tolerances (i.e., clock precision) have to be taken into account.

It is noted that, since the transmission power of the external device 101 has to be such that the messages 102 can reach the network 200, transmissions within the network 200 during the transmission of the message 102 from the external device 101 are likely to be interfered with, and therefore, may not be received by the intended recipients. However, this period typically will be short and will only temporarily impede communication within the network.

An alternative example of the transmission sequence pattern from the external device 101 is shown in FIG. 10, wherein, rather than continuously repeating transmission of the message 102, transmission of the copies of the message 102 is spread apart. The duration of the listening slot 100 is at least the length of the control data block 102, i.e., the message 102 (or, stated otherwise, the length of the message 102 is less than the duration of the listening slot 100). The repetition periodicity ("gap between transmissions" in FIG. 10), i.e., the time period between the beginning of the first copy of the message 102 and the beginning of the transmission of the second copy of the message 102, is at least the length of the periodicity of the listening slots (i.e., $t_{delta}$) plus the length of the listening slot 100 minus the length of the message 102. Such selection of the transmission sequence pattern causes a shift of successive transmissions between frames, so that the message 102 will eventually fall into one of the listening slots 100 and thus can be received by the synchronized network members.

It is noted that, in this embodiment, transmission of the messages 102 has a smaller impact on communication within the network 200, since the external device 101 sends at most one message 102 per frame and therefore does not interfere with multiple consecutive audio data packets in a single frame, thus resulting in shorter audio interruption. However, this is achieved at the cost of potentially longer delay necessary to feed a message 102 into the network 200: since the shift is the difference of the duration of the listening slot and the duration of the message 102, it may take $t_{delta}$ *($t_{delta}$/duration of listening slot—duration of message), before a message 102 transmitted by the external device 101 falls into one of the listening slots 100.

Preferably, in all embodiments, the external device 101 is paired with the network 200 so that the synchronized network members only recognize control data/commands sent from specific, i.e., paired, external devices 101, while ignoring commands from other devices outside the network 200.

Typically, the method of the present invention may be used for controlling the network 200 via remote control commands from a non-synchronized remote control, with the external device 101 acting as such remote control. In this case, the message 102 typically is for making the transmission unit 210 at least temporarily cease the transmission of audio data via the wireless network link 212 (and/or to make other synchronized network members, such as the hearing aids 16R, 16L, to at least temporarily cease data transmission). After the network members have complied with such request from the external device 101, the external device 101 may transmit another message which makes the network members reestablish their transmission activities. In between the message to silence the network and the message to reestablish network communication another, larger message may be transmitted from the external device 101 without interfering with the internal network communication, since anyway no internal network communication takes place after the request to silence the network has been received.

A message 102 representing a request to silence the network 200 can be very short, and thus, the listening slot 100 can be similarly short, thereby introducing very little disturbance of the internal communication within the network 200 and not wasting a lot of network bandwidth for control data.

Figure 11:
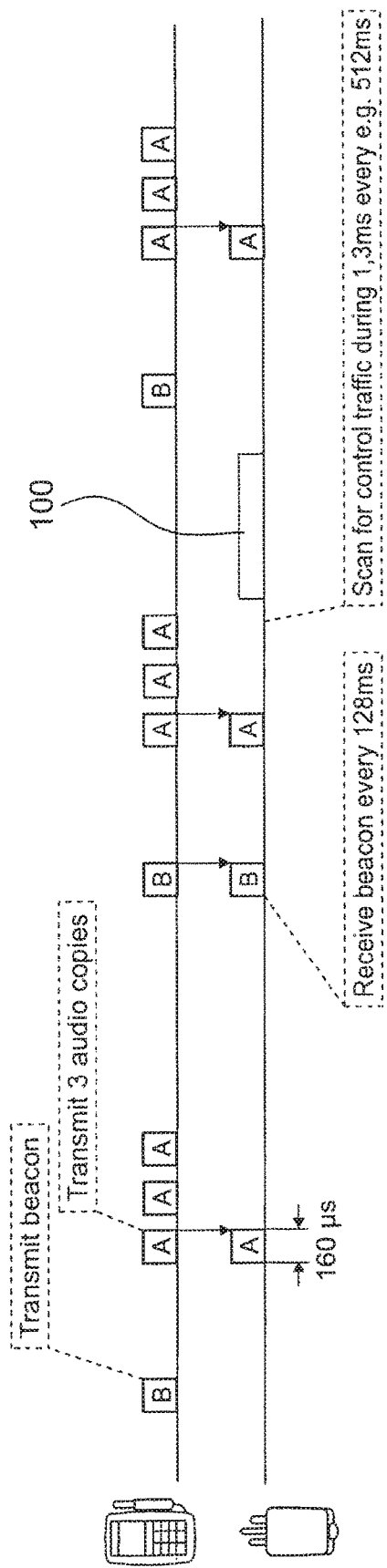
FIG. 11 shows an example of the TDMA frame scheme of a system according to the invention using a frequency hopping scheme.
Figure 12:
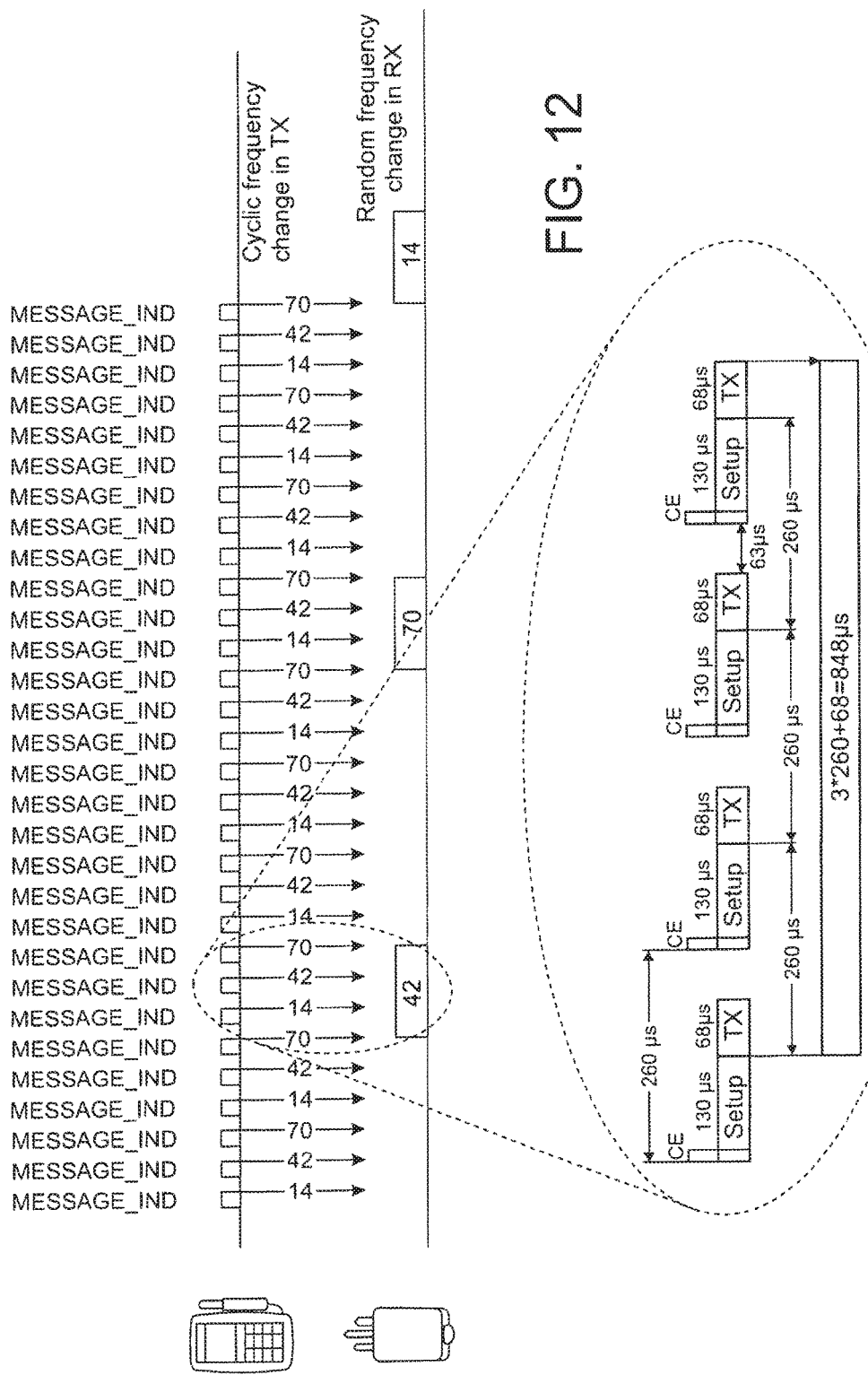
FIG. 12 shows an example of the TDMA frame scheme of FIG. 11 together with the transmission signals of an external control device.
Figure 13:
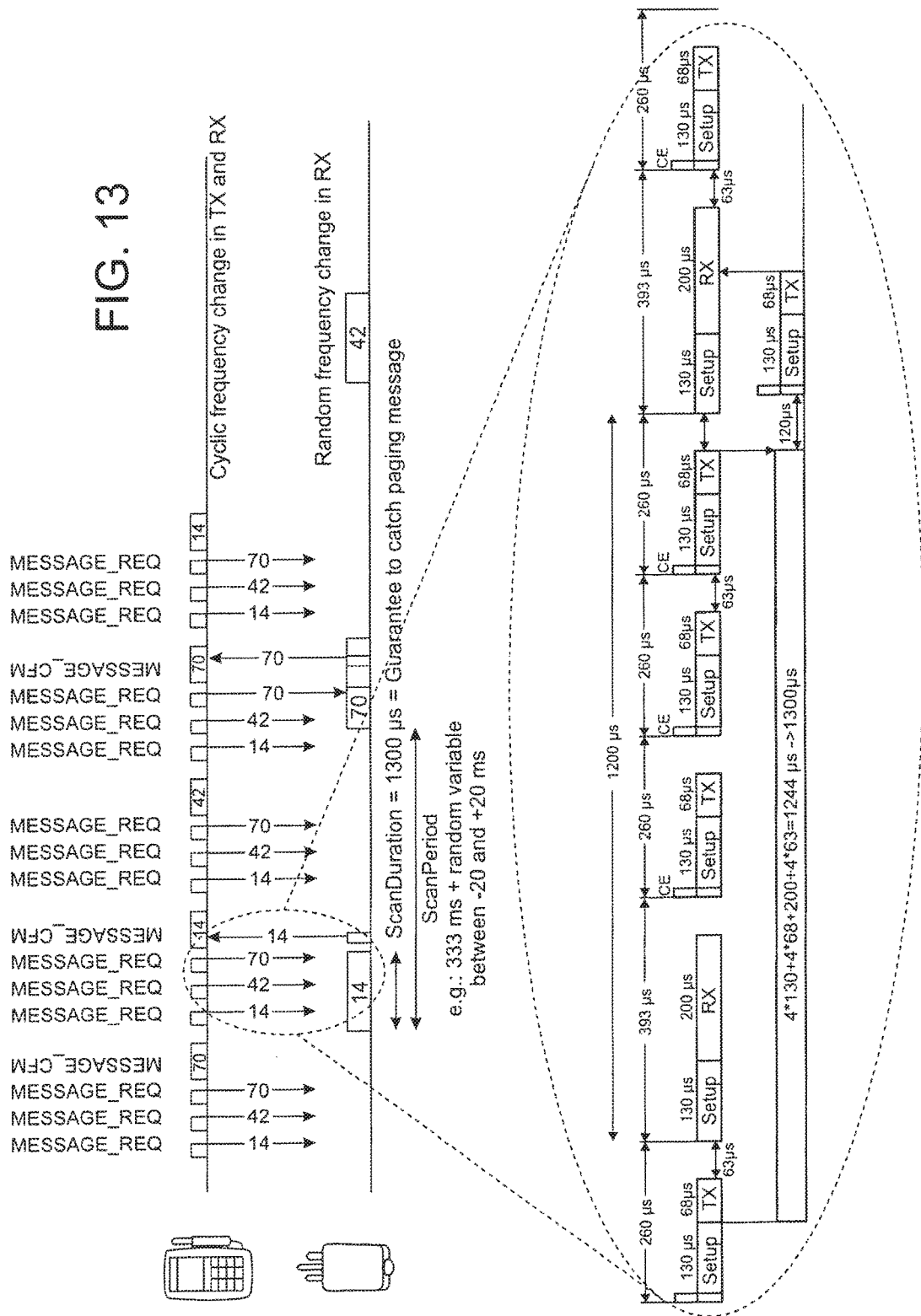
FIG. 13 is a view like FIG. 12, wherein an alternative embodiment of the TDMA frame scheme is shown.

In FIGS. 11 to 13, examples of the TDMA frame structure suitable for embodiments of the invention are shown wherein the wireless network link is an electromagnetic link 12.

Typical carrier frequencies for the digital link 12 are 865 MHz, 915 MHz and 2.45 GHz, wherein the latter band is preferred. Examples of the digital modulation scheme are PSK/FSK, ASK or combined amplitude and phase modulations such as QAM, and variations thereof (for example, GFSK).

The preferred codec used for encoding the audio data is sub-band ADPCM (Adaptive Differential Pulse-Code Modulation).

Preferably, data transmission occurs in the form of TDMA (Time Division Multiple Access) frames comprising a plurality (for example, 10) of time slots, wherein in each slot one data packet may be transmitted (alternatively, several data packets may be sent during a slot). In FIG. 11, an example is shown wherein the TDMA frame has a length of 4 ms and is divided into 10 time slots of 400 μs, with each data packet having a length of 160 μs.

Preferably, a slow frequency hopping scheme is used, wherein each slot is transmitted at a different frequency according to a frequency hopping sequence calculated by a given algorithm in the same manner by the transmitter unit 10 and the receiver units 14, wherein the frequency sequence is a pseudo-random sequence depending on the number of the present TDMA frame (sequence number), a constant odd number defining the hopping sequence (hopping sequence ID) and the frequency of the last slot of the previous frame.

The first slot of each TDMA frame may be allocated to the periodic transmission of a beacon packet which contains the sequence number numbering the TDMA frame and other data necessary for synchronizing the network, such as information relevant for the audio stream, such as description of the encoding format, description of the audio content, gain parameter, surrounding noise level, etc., information relevant for multi-talker network operation, and optionally control data for all or a specific one of the receiver units.

At least some of the other slots are allocated to the transmission of audio data packets, wherein each audio data packet usually is repeated at least once, typically in subsequent slots. In the example shown in FIG. 11, three subsequent slots are used for three-fold transmission of a single audio data packet. The master device does not expect any acknowledgement from the slaves devices (receiver units), i.e., repetition of the audio data packets is done in any case, irrespective of whether the receiver unit has correctly received the first audio data packet or not. Also, the receiver units usually are not individually addressed by sending a device ID, i.e., the same signals are sent to all receiver units (broadcast mode).

Rather than allocating separate slots to the beacon packet and the response of the slaves, the beacon packet and the response data may be multiplexed on the same slot.

When the receiver unit has correctly received already the first transmission of a certain audio data packet, it stops listening to the second and third transmission of the same audio data packet.

In each TDMA frame or in every n-th TDMA frame a listening slot 100 is provided during which there is no data transmission within the synchronized network members.

The listening slots 100 are reserved for controlling data traffic at one of a number of predefined public frequencies (channels), with external control devices transmitting at one of these public frequencies and with the synchronized network members listening, during the listening slots 100, at these public frequencies. For example, the network members may listen subsequently at all of the public frequencies during the listening slots 100.

According to one embodiment, each control data block/message 102 is transmitted in continuous repetition by the external control device 101 at all public frequencies in a cyclic manner, with the transmission of the control data block 102 being repeated with a short transmission period, wherein each synchronized network member listens at a single one of the public frequencies during each listening slot 100, with each synchronized network member listening at a different one of the public frequencies during subsequent listening slots in order to address all of the public frequencies. Such frequency change of the listening slots may be cyclic or random.

In the examples of FIGS. 12 and 13 there are three public frequencies corresponding to channels 14, 42 and 70.

In the example of FIG. 12, the duration of each listening slot 100 is at least the number of public frequencies times the length of the transmission period of the control data block 102 plus the length of the control data block 102, with the external control device 101 not waiting for any response from the synchronized network members.

Thus, the control message transmission latency can be minimized, since the duration of the listening slot guarantees that at least one control data packet 102 is transmitted at the correct frequency within the listening slot 100, irrespective of the specific one of the public frequencies at which the synchronized network member listens during that listening slot 100.

In case that bidirectional control message transmission is required, the transmissions from the external device 101 have to be interleaved with periods where the external device 101 waits for potential responses. While the simplest approach would be to have a response listening window after every transmission from the external device 101, a more optimized approach is to have a single response listening window after transmission has occurred at all of the public frequencies (i.e., in the example of FIG. 13, after three transmissions). Each control data block is subsequently transmitted from the external control device 101 at all public frequencies, with the transmission of the control data block being repeated with a transmission period and with a response listening slot of the external control device being provided every time when the control data block has been transmitted at all of the public frequencies before the next control data transmission cycle is started, wherein the duration of the listening slot of the synchronized network members is at least in a number of public frequencies times the length of the transmission period of the control data block plus the length of the control data block plus the length of the response listening slot of the external control device.

When selecting the length of the listening slot 100, one has to optimize the system either with regard to unidirectional communication from the external device 101 or for bidirectional communication with the external device 101. For example, when the listening period 100 is optimized for unidirectional communication, the transmission delay in case of bidirectional communication will be increased, since the probability for receiving the message 102 within the listening slot 100 will be less than 100%. On the other hand, if the listening slot 100 is optimized for bidirectional communication, there will be some power consumption penalty in the case of unidirectional communication.

With regard to the listening slot periodicity (i.e., the time interval from the beginning of one listening slot to the beginning of the next listening slot) there is a trade-off between the average power consumption of the listening activity and the latency for the transmission of the message 102. In principle, the listening slot periodicity may be constant or it may be randomized. Since the external device is not synchronized to the network members and since the messages are transmitted from the external device as a compact train of repetitions, it is guaranteed that already the first listening period will be successful in receiving the message.

Preferably, not more than three public frequencies (channels) are used, which may correspond to the low mid and high part of the 2,400 GHz to 2,483 GHz band. For transmission of the audio signals between the synchronized network members for example 40 channels may be used.

In general, all kinds of modulation may be used in the invention, such as Amplitude Shift Keying (ASK) with M modulation stages; Phase Shift Keying like BPSK, QPSK, 8-PSK or M-ary PSK; Frequency Shift Keying like BFSK, M-ary FSK, OFDM, CPFSK with two frequencies; Quadrature Amplitude Modulation (QAM), Spread Spectrum like DSSS (direct sequence spread spectrum) or FHSS (frequency hopping spread spectrum); and Pragmatic Trellis Code Modulation (PTCM).

As already mentioned above, in addition to audio data usually other kinds of data, such as control data, may be transmitted within the TDMA frame structures via the wireless link, i.e., the network, since the invention, as far as the transmission of control of a not-synchronized control device to a synchronized network member is concerned, is not restricted to the type of data exchanged within the network (examples of other types of data are web browsing data, video data and file transfer data).

Also, the frames, rather than having a pure TDMA structure, may have a structure corresponding to a combination of TDMA and FDMA, as used, for example in telephone networks.

What is claimed is:

1. A method for providing sound, the method comprising:
converting received audio into audio data;
transmitting the audio data via a digital wireless link from a transmission unit to a receiver unit;
synchronizing the receiver unit and the transmitting unit to form a wireless network comprising the transmission unit and the receiver unit as synchronized network members;
providing sound to a user based at least partially on the audio data received at the receiver unit,
wherein the audio data is transmitted as audio data packets in separate slots of a frame structure,
wherein the frame structure comprises a listening slot during which at least one of the synchronized network members listens; and
transmitting control data from an external control device to the receiver unit in a control data block
wherein the control data block has a length that includes at least two repeated control data packets,
wherein the listening slot has a length at least twice the length of the control data block, and
wherein the external control device is not a synchronized network member.

2. The method of claim 1, wherein the audio data is repeated at least once in the separate slots of the frame structure during the transmission.

3. The method of claim 1, wherein the listening slot is at least twice the duration of the transmission of the control data from the external device.

4. The method of claim 1, wherein the transmission unit is at least one of the following:
a television;
a mobile phone;
a portable music streaming device;
a FM radio;
a telephone; or
a body-worn microphone.

5. The method of claim 1, wherein the digital link operates on at least one of the following frequencies:
865 MHz;
915 MHz; or
2.45 GHz.

6. The method of claim 1, wherein transmitting the audio data further comprises:
implementing a frequency hopping scheme,
wherein each slot is transmitted at a different frequency accordingly to a frequency hopping sequence based on a pseudo-random algorithm.

7. The method of claim 1, wherein the external control device is a remote control.

8. A system for providing sound, the system comprising:
an audio receiving device, wherein the audio receiving device is configured to:
receive audio sounds and convert the audio sounds to audio data;
transmit the audio data via a digital wireless link,
wherein the audio data is transmitted as audio data packets in separate slots of a frame structure,
wherein the frame structure comprises a listening slot during which at least one of the synchronized network members listens;

a listening device, wherein the listening device is configured to:
  receive the transmitted audio data and provide an output audio signal to a user;
  synchronize the audio receiving device and the listening device to form a wireless network comprising the audio receiving device and the listening device as synchronized network members; and
a remote control device configured to transmit control data to the listening device or the audio receiving device in a control data block
  wherein the control data block has a length that includes at least two repeated control data packets,
  wherein the listening slot has a length at least twice the length of the control data block, and
  wherein the remote control device is not a synchronized network member.

9. The system of claim 8, wherein the audio receiving unit is at least one of the following:
  a television;
  a mobile phone;
  a portable music streaming device;
  a FM radio;
  a telephone; or
  a body-worn microphone.

10. The system of claim 8, wherein the remote control device is a remote control.

11. The system of claim 8, wherein the audio receiving device is further configured to:
  implement a frequency hopping scheme,
    wherein each slot is transmitted at a different frequency accordingly to a frequency hopping sequence based on a pseudo-random algorithm.

12. The system of claim 8, wherein the listening device is a hearing aid.

13. The system of claim 8, wherein the audio receiving device is further configured to transmit repeated audio data packets at least once in the separate slots of the frame structure.

14. The system of claim 8, wherein the listening device is further configured to not acknowledge receipt of the audio data packets.

15. A non-transitory computer readable medium storing instructions that when executed by a processor coupled to the non-transitory computer readable medium cause a system to perform operations, the operations comprising:
  converting received audio into audio data;
  transmitting the audio data via a digital wireless link from a transmission unit to a receiver unit;
  synchronizing the receiver unit and the transmitting unit to form a wireless network comprising the transmission unit and the receiver unit as synchronized network members;
  providing sound to a user based at least partially on the audio data received at the receiver unit,
    wherein the audio data is transmitted as audio data packets in separate slots of a frame structure,
    wherein the frame structure comprises a listening slot during which at least one of the synchronized network members listens; and
  transmitting control data from an external control device to the receiver unit in a control data block
    wherein the control data block has a length that includes at least two repeated control data packets,
    wherein the listening slot has a length at least twice the length of the control data block, and
    wherein the external control device is not a synchronized network member.

16. The non-transitory computer readable medium of claim 15, wherein the audio data is repeated at least once in the separate slots of the frame structure during the transmission.

17. The non-transitory computer readable medium of claim 15, wherein the listening slot is at least twice the duration of the transmission of the control data from the external device.

18. The non-transitory computer readable medium of claim 15, wherein the transmission unit is at least one of the following:
  a television;
  a mobile phone;
  a portable music streaming device;
  a FM radio;
  a telephone; or
  body-worn microphone.

19. The non-transitory computer readable medium of claim 15, wherein transmitting the audio data further comprises:
  implementing a frequency hopping scheme,
    wherein each slot is transmitted at a different frequency accordingly to a frequency hopping sequence based on a pseudo-random algorithm.

20. The non-transitory computer readable medium of claim 15, wherein the receiver unit does not acknowledge receipt of the audio data packets.

* * * * *